United States Patent Office 3,096,331
Patented July 2, 1963

3,096,331
CHLORINATION OF ALKYLPYRAZINES
William K. Langdon, Grosse Ile, and Michael Kokorudz, Southgate, Mich., assignors to Wyandotte Chemicals Corporation, Wyandotte, Mich., a corporation of Michigan
No Drawing. Filed Mar. 17, 1961, Ser. No. 96,362
10 Claims. (Cl. 260—250)

This invention relates to the chlorination of alkylpyrazines. More particularly, it relates to the nuclear monochlorination of alkylpyrazines in liquid phase. Still more particularly, it relates to a method for the nuclear monochlorination of methylpyrazine, ethylpyrazine, 2,5-dimethylpyrazine and 2,5-diethylpyrazine.

2-chloro-3-methyl-, 2-chloro-3-ethyl-, 3-chloro-2,5- dimethyl- and 3-chloro-2,5-diethylpyrazine are known compounds whose chemical and physical properties make them of interest as intermediates in many fields of application including polymers, pesticides, pharmaceuticals and rubber chemistry.

Prior art concerning the nuclear chlorination of alkylpyrazines is exceedingly sparse. The majority of references found on the subject teach the chlorination of pyrazines in the vapor phase at temperatures in excess of 300° C. Even these references give no suggestion that a liquid phase nuclear chlorination of alkylpyrazine might be possible. Subsequently, Karmas and Spoerri, Jour. Am. Chem. Soc., 74, 1580 (1952), devised a method for synthesizing 2-chloro-3-methylpyrazine and 3-chloro-2,5-dimethylpyrazine which comprised making 2-hydroxy-3-methylpyrazine and 3-hydroxy-2,5-dimethylpyrazine and then reacting the hydroxy compound with phosphorus oxychloride. However, this type of reaction is not commercially feasible in that it is somewhat difficult to carry out as well as costly.

It is an object of this invention, therefore, to provide a new method for preparing nuclear monochlorinated alkylpyrazines.

It is a further object of this invention to provide an efficient and economical synthesis for nuclear chlorinated alkylpyrazines in high yield.

We have found that methylpyrazine, ethylpyrazine, 2,5-dimethylpyrazine and 2,5-diethylpyrazine can be mononuclear-chlorinated in the liquid phase by adding the alkylpyrazine to a solution of chlorine and carbon tetrachloride or chlorine and chloroform provided that the following conditions are met:

(a) An initial chlorine-alkylpyrazine mol ratio of at least 2:1,
(b) A chlorine concentration with respect to the solvent, e.g., carbon tetrachloride or chloroform, of at least 1% by weight, and
(c) A solvent temperature of about 25° C. to the boiling point of the solvent.

When the alkylpyrazine employed in the method of this invention is methylpyrazine, the product is 2-methyl-3-chloropyrazine; likewise, the chlorination of ethylpyrazine results in 2-ethyl-3-chloropyrazine. When 2,5-dimethylpyrazine is employed the product is 3-chloro-2,5-dimethylpyrazine and when 2,5-diethylpyrazine is employed, the product is 3-chloro-2,5-diethylpyrazine.

One of the most significant factors in the process of this invention is that conversions of over 65% are obtained. While the reaction mechanism has not been definitely and unequivocally established, it is believed that the chlorination of the alkylpyrazine probably takes place in two steps; an addition compound of the chlorine and the alkylpyrazine is first formed and then this addition compound is either further chlorinated with excess chlorine or reacts intramolecularly to give the desired product.

The determination of the molecular structure of the chlorinated alkylpyrazine products of the process of this invention was based on comparisons of derivatives of the chloropyrazines with compounds of unequivocal structure as well as on physical data. For example, 2-chloro-3-methylpyrazine prepared by the method of this invention was hydrolyzed with aqueous alkali to form 2-hydroxy-3-methylpyrazine. 2 - hydroxy-3-methylpyrazine was also prepared from alanineamide and glyoxal and this was shown to be identical with the compound prepared by the alkaline hydrolysis of 2-chloro-3-methylpyrazine. Infrared spectra analysis of the hydrolyzed chloro derivative revealed it existed as a tautomeric keto form corresponding to 2-hydroxy-3-methylpyrazine. Had the chloro derivative given hydroxymethylpyrazine upon hydrolysis, then a tautomeric keto form would not be possible. Both nuclear magnetic resonance spectroscopy and the dipole moment of 2-chloro-3-methylpyrazine furnished additional confirmation of molecular structure. The chloro compounds which were prepared are listed in Table 1 along with their pertinent physical properties.

TABLE 1
*Alkylchloropyrazines*

| Compound | Physical Constants | |
|---|---|---|
| | Found | Literature [a] |
| 2-Chloro-3-methylpyrazine | B.P. 55–65°/15 mm. $n_D^{25}$ 1.5262 | 94–96°/65 mm. $n_D^{25}$ 1.5302(4) |
| 2-Chloro-3-ethylpyrazine | B.P. 67–68°/10 mm. $n_D^{25}$ 1.5233 | 110–111°/72 mm. $n_D^{22}$ 1.5244 |
| 3-Chloro-2,5-dimethylpyrazine | B.P. 64–65°/12 mm. $n_D^{25}$ 1.5237 | 112–113°/70 mm. $n_D^{26}$ 1.5243(4) |
| 3-Chloro-2,5-diethylpyrazine | B.P. 81–91°/6 mm. $n_D^{25}$ 1.5148 | (b) |

[a] G. Karmas, P. E. Spoerri, Jour. Am. Chem. Soc., 74, 1580 (1952).
[b] The absence of data indicates that the compound was not previously reported.

For undetermined reasons, the method of this invention has only been useful in chlorinating methylpyrazine, ethylpyrazine, 2,5-dimethylpyrazine and 2,5-diethylpyrazine. Numerous attempts to chlorinate other pyrazines have been unsuccessful. For example, 2,6-dimethylpyrazine, tetramethylpyrazine and pyrazine itself either did not react with the chlorine or reacted to such a slight extent that it was impossible to identify or separate the product. Generally, when dealing with the alkylpyrazines which could not be chlorinated it was possible to recover the reactants. Also unexplainable was our failure to dichlorinate any of the pyrazines including those compounds which did lend themselves to monochlorination. The method of this invention can be carried out over a temperature range from about 25° C. to about the boiling point of the solvent. It has been found that in attempting to carry out the chlorination below 25° C. the reaction proceeds at such a slow rate that it becomes impractical while at a temperature above the boiling point of the solvent the chlorination is difficult to control. Thus, when carbon tetrachloride is selected as the solvent the temperature range would be from about 25° C. to 76° C. assuming the chlorination to be carried out under atmospheric pressure. The preferred temperature range wherein optimum conversions and yields are obtained is from about 35° C. to about 50° C.

The method of this invention is not restricted to the use of any particular pressure within the reaction vessel, other than the requirement that the solvent and pyrazine be maintained in liquid phase, although atmospheric pressure is preferred. As was discussed above the highest temperature at which the method of this invention may be executed is the boiling point of the solvent. Hence, by using superatmospheric pressure within the reaction vessel the upper temperature limit may be extended. A further advantage to the use of superatmospheric pressure is that a greater amount of chlorine can be held in solution, thereby insuring that a sufficient amount of chlorine is present in the reaction mixture. The use and range of superatmospheric pressure which may be employed are dictated primarily by equipment design and economic considerations.

During the development of the process of this invention the chlorination of the alkylpyrazine was attempted by adding the alkylpyrazine to carbon tetrachloride and then passing chlorine through the carbon tetrachloride. It was found that this method was not practical in that a lengthy induction period occurred during which no chlorination took place; then without warning the reaction would commence in a vigorously exothermic and practically uncontrollable manner. It was then discovered that if chlorine was first added to the carbon tetrachloride and then the alkylpyrazine added, the chlorination reaction would initiate much faster and thereby avoid a build-up of reactants which would culminate in an uncontrollable reaction. It was next discovered that even if the alkylpyrazine were added subsequent to the addition of the chlorine the chlorine concentration with respect to both the carbon tetrachloride and alkylpyrazine was critical. It was found that for the chlorination reaction to initiate the chlorine to alkylpyrazine mol weight ratio had to be a minimum of 2:1 and in addition that the chlorine concentration with respect to the carbon tetrachloride had to be at least 1% by weight of the carbon tetrachloride.

Once the reaction is initiated the amount of chlorine supplied to the reaction with respect to the alkylpyrazine may be reduced. The stoichiometry of the reaction dictates that the minimum mol weight ratio between the chlorine and alkylpyrazine be 1:1. Hence, upon initiating the chlorination reaction at a minimum chlorine to alkylpyrazine mol weight ratio of 2:1 the subsequent mol weight ratio of chlorine to alkylpyrazine may be cut back to 1:1. It should be pointed out that in all cases an excess of chlorine may be employed over and above the minimum required as set forth above, wherein the upper limit is dictated primarily by economic considerations. Hence, the solvent heated to a temperature of about 35° C. to about 50° C. can be substantially saturated with chlorine and then an alkylpyrazine selected from the group consisting of methyl-, ethyl-, 2,5-dimethyl- and 2,5-diethylpyrazine added to the solvent while chlorine is passed through the solvent in a minimum amount of 1 mol of chlorine per each mol of alkylpyrazine added.

The term "substantially saturated" is employed in the above description of the invention because at any particular temperature and pressure the solvent would be required to hold an exact amount of chlorine in order to be termed "saturated"; therefore, it was desired not to imply that this exact amount was present.

Due to the highly exothermic nature of the chlorination reaction it has been found helpful in maintaining the proper reaction temperature range to add the chlorine and alkylpyrazine to the solvent by incremental addition thereby helping to avoid a build-up of reactants. External methods of cooling, such as ice baths, are also of value in maintaining a proper temperature.

The chlorination of the alkylpyrazine results in the formation of a nuclear monochlorinated alkylpyrazine hydrochloride. In the case of methylpyrazine, ethylpyrazine and 2,5-dimethylpyrazine the hydrochloride is insoluble and will precipitate out of solution. The 3-chloro-2,5-diethylpyrazine hydrochloride is soluble in the mixture and hence will not precipitate. In either case, to obtain the "pure" chlorinated alkylpyrazine it is necessary to remove the hydrogen chloride from the molecule. This can be done by treating the precipitate with an alkaline solution which may be illustrated as follows:

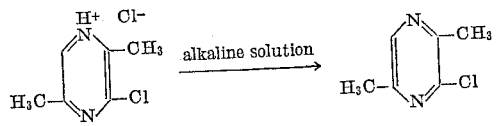

Since the alkylpyrazine bases are very weak the alkaline solution may contain any alkaline material such as caustic soda, soda ash, and sodium phosphate. The alkaline solution should be an aqueous solution to avoid any side reactions. The hydrogen chloride may also be removed by dissolving the precipitate in water to hydrolyze the hydrochloride and then adding an alkaline solution to neutralize the hydrogen chloride. In the case of chlorodiethylpyrazine the water and alkaline solution may be added directly to the reacted mixture.

In a preferred embodiment of this invention carbon tetrachloride is heated to a temperature from 35° C. to 50° C. and chlorine is added followed by an alkylpyrazine selected from the group consisting of methylpyrazine, ethylpyrazine, 2,5-dimethylpyrazine and 2,5-diethylpyrazine. During the initiation of the chlorination the chlorine to alkylpyrazine mol weight ratio is at least 2:1 and the chlorine is present in a minimum of 1% by weight of the carbon tetrachloride. Thereafter, additional chlorine and alkylpyrazine are added to the carbon tetrachloride in incremental additions. The chlorine to alkylpyrazine mol weight ratio of these subsequent additions is reduced gradually in the interest of economy with the minimum ratio being 1:1. During the entire reaction the temperature is maintained from about 35° C. to about 50° C.

Recovery of 2-chloro-3-methylpyrazine, 2-chloro-3-ethylpyrazine and 3-chloro-2,5-dimethylpyrazine was achieved by separating the precipitated product hydrochloride from the reactants by filtration, dissolving the precipitate in an aqueous alkaline solution and fractionally distilling the organic layer. It was subsequently found that, if the organic layer were steam distilled and the distillate fractionally distilled, a higher yield of product was obtained. In addition, the steam distillation should be carried out under slightly alkaline conditions since condensation reactions take place under acidic conditions which results in a loss of product. For the same reason, it is advisable to add a mild base such as magnesium oxide to the stillpot during the step of fractional distillation. Because 3-chloro-2,5-diethylpyrazine hydrochloride is soluble in the reaction mixture the product is recovered by techniques as illustrated in Example 3.

In regard to the recovery steps, it is not necessary that the product hydrochloride be separated from the reaction mixture prior to distilling and fractionating for it is equally as feasible to add an alkaline solution directly to the reaction mixture containing the product hydrochloride suspended in the solvent and steam distill directly.

Another advantage of this invention is that it lends itself especially well for use in a continuous process wherein the crude reaction product is put through a filter medium to separate the product and the filtrate is recycled as solvent.

The following examples are provided so as to more clearly illustrate the method of this invention to those skilled in the art and they should not be employed to unduly restrict the invention as disclosed and claimed herein. The terms "conversion" and "yield" are employed in this invention and are defined as follows:

$$\text{Percent conversion} = \frac{(\text{mols product obtained}) \times (100)}{(\text{mols reactants charged})}$$

$$\text{Percent yield} = \frac{(\text{mols product obtained}) \times 100}{(\text{mols reactants charged}) - (\text{mols reactants recovered})}$$

EXAMPLE 1

A charge of 5.4 liters of carbon tetrachloride was placed into a 12-liter flask equipped with stirrer, Dry Ice acetone condenser and dropping funnel. The carbon tetrachloride was heated to 40° C. and 142 grams (2 mols) of chlorine were added to it through a tube ending above the surface of the carbon tetrachloride. 94 grams (1 mol) of methylpyrazine were added to the carbon tetrachloride within a five-minute period resulting in an exothermic reaction. The addition of reactants was repeated in this manner until a total of 426 grams (6 mols) of chlorine and 282 grams (3 mols) of methylpyrazine were added. The addition required approximately one and one-half hours and during this time precipitation of 2-chloro-3-methylpyrazine occurred. The amount of chlorine was then reduced to 71 grams (1 mol) while the weight of methylpyrazine was maintained at 94 grams (1 mol) for the next three additions. Finally, chlorine and methylpyrazine were added in 48 and 94 gram batches, respectively, until a total of 937 grams (13.2 mols) of chlorine and 1128 grams (12 mols) of methylpyrazine representing a chlorine to methylpyrazine mol ratio of 1.1:1 had been added to the carbon tetrachloride. The total time of addition was six hours.

After standing overnight the product hydrochloride was removed by filtration and washed with carbon tetrachloride. The filter cake was then slurried with 500 ml. of water and the mixture neutralized with 1.2 liters of 35% sodium hydroxide aqueous solution while its temperature was maintained at approximately 40° with cooling. The mixture was filtered and separated. The aqueous layer was washed with carbon tetrachloride and the organic layers combined and distilled at atmospheric pressure until the pot temperature reached 100° C. whereupon the remainder of the residue was distilled under vacuum. The final yield of 2-chloro-3-methylpyrazine was 1029 grams (67%); B.P. 55–65°/15 mm.; $n_D^{25}$ 1.5262.

EXAMPLE 2

A charge of 4.1 liters of carbon tetrachloride was placed into a 12-liter flask equipped with stirrer, Dry Ice condenser and dropping funnel. The carbon tetrachloride was heated to 40° C. and 192 grams of chlorine were added to it through a tube ending above the surface of the carbon tetrachloride. 288 milliliters (1.33 mols) of a 1:1 solution (by volume) of 2,5-dimethylpyrazine and carbon tetrachloride corresponding to a 2:1 mol ratio of chlorine to 2,5-dimethylpyrazine were added to the carbon tetrachloride in about eight minutes. The 3-chloro-2,5-dimethylpyrazine hydrochloride began precipitating almost immediately. After 12 minutes the addition of chlorine and dimethylpyrazine was repeated. Cooling was found to be necessary during the dimethylpyrazine addition in order to maintain a constant temperature. After two initial chlorine additions the mixture would no longer retain 192-gram portions of chlorine so that this amount was cut down to 96 grams and later to 48 grams. In this manner 672 grams (9.45 mols) of chlorine and 792 grams (7.33 mols) of dimethylpyrazine were added in four hours and 20 minutes. Finally, 360 ml. (1.67 mols) of a 1:1 (by volume) carbon tetrachloride and 2,5-dimethylpyrazine solution were added over a 50-minute period to bring the final chlorine:dimethylpyrazine mol ratio to 1.05:1. The final concentrations were 672 grams (9.45 mols) of chlorine and 872 grams (9 mols) of 2,5-dimethylpyrazine in 972 ml. of carbon tetrachloride (not including the initial charge of 4.1 liters of carbon tetrachloride).

The precipitate of 3-chloro-2,5-dimethylpyrazine hydrochloride was removed from the reactants by filtration and washed with carbon tetrachloride. The filter cake was slurried with 450 milliliters of water and neutralized with 691 grams of 50% sodium hydroxide aqueous solution while its temperature was maintained at approximately 40° C. with cooling. The mixture was filtered and separated. The aqueous layer was washed with 300 ml. of 30–60° petroleum ether and the organic layers combined and distilled. The final yield of 3-chloro-2,5-dimethylpyrazine was 1120 grams (87%); B.P. 64°/10 mm. to 65°/12 mm.; $n_D^{25}$ 1.5237.

EXAMPLE 3

In this example the equipment described in Example 1 was used. A stream of chlorine gas was passed over the surface of 500 ml. of stirred carbon tetrachloride heated to 40° C. When the solvent was essentially saturated, as evidenced by the decrease in rate of chlorine absorption, 30 ml. of 2,5-diethylpyrazine was added with stirring and the temperature maintained at 40° C. After about 30 minutes, additional chlorine and 2,5-diethylpyrazine were added to the carbon tetrachloride in the mol ratio of 2:1 respectively. After approximately 15 minutes additional 2,5-diethylpyrazine was added making the mol ratio of chlorine to 2,5-diethylpyrazine present in the reaction mixture 1.27:1. In this manner, a total of 205.5 grams (1.5 mols) of 2,5-diethylpyrazine and 140 grams (1.9 mols) of chlorine were added to the carbon tetrachloride. By the addition of the reactants in incremental amounts and the use of an ice bath the temperature of the reaction mixture was maintained in the range of 40° C. to 60° C. When the reaction of the 2,5-diethylpyrazine and chlorine had terminated as evidenced by the sudden cessation of heat evolution, a mixture of 176 grams of sodium bicarbonate and 250 ml. of water was added with stirring and the mixture was filtered. The organic layer was separated, dried over anhydrous magnesium sulfate and fractionally distilled. The yield of 3-chloro-2,5-diethylpyrazine was 194 grams (76%); B.P. 81°/5 mm.–91°/6 mm.; $n_D^{25}$ 1.5148.

It is apparent that the objectives of this invention have been accomplished. Broadly speaking, a new method of preparing nuclear monochlorinated alkylpyrazines with high conversions and yields has been provided which comprises introducing the alkylpyrazine to be chlorinated into a solution of chlorine and solvent, as herein defined, the solution containing a minimum of 1 percent by weight of chlorine, the method being further characterized by having a minimum initial chlorine:alkylpyrazine mol ratio of 2:1.

We claim:

1. A liquid phase process of preparing mononuclear-chlorinated alkylpyrazines which comprises adding chlorine to a liquid solvent selected from the group consisting of carbon tetrachloride and chloroform and subsequently adding thereto an alkylpyrazine selected from the group consisting of methylpyrazine, ethylpyrazine, 2,5-dimethylpyrazine and 2,5-diethylpyrazine while maintaining the solvent at a temperature from about 25° C. to about the boiling point of the solvent; the process being further characterized by having a minimum initial chlorine:alkylpyrazine mol weight ratio of 2:1 and having a chlorine concentration with respect to the solvent of at least 1% by weight.

2. The method of claim 1 wherein the alkylpyrazine is methylpyrazine.

3. The method of claim 1 wherein the alkylpyrazine is ethylpyrazine.

4. The method of claim 1 wherein the alkylpyrazine is 2,5-dimethylpyrazine.

5. The method of claim 1 wherein the alkylpyrazine is 2,5-diethylpyrazine.

6. The method of claim 1 wherein the solvent is carbon tetrachloride.

7. The method of claim 1 wherein the solvent is chloroform.

8. The method of claim 1 wherein the solvent temperature is maintained from 35° C. to 50° C.

9. A liquid phase process of preparing mononuclear-chlorinated alkylpyrazines which comprises adding chlorine to liquid carbon tetrachloride in a minimum amount of 1% by weight of the carbon tetrachloride and subsequently adding thereto an alkylpyrazine selected from the group consisting of methylpyrazine, ethylpyrazine, 2,5-dimethylpyrazine and 2,5-diethylpyrazine in an amount such that the minimum initial chlorine:alkylpyrazine mol weight ratio is 2:1 and maintaining the solvent at a temperature from about 35° C. to about 50° C.; adding to the solvent in increments additional chlorine and alkylpyrazine in a minimum chlorine:alkylpyrazine mol weight ratio of 1:1 and maintaining the chlorine concentration within and with respect to the carbon tetrachloride at at least 1% by weight.

10. A liquid phase process of preparing mononuclear-chlorinated alkylpyrazines which comprises substantially saturating carbon tetrachloride with chlorine, said carbon tetrachloride being at atmospheric pressure and at a temperature of about 35° C. to about 50° C., and adding thereto an alkylpyrazine selected from the group consisting of methylpyrazine, ethylpyrazine, 2,5-dimethylpyrazine and 2,5-diethylpyrazine while simultaneously passing chlorine through the carbon tetrachloride in the minimum amount of about 1 mol of chlorine per mol of alkylpyrazine added and maintaining the carbon tetrachloride at a temperature of about 35° C. to about 50° C.

No references cited.